United States Patent
Ishino

(10) Patent No.: US 6,812,177 B2
(45) Date of Patent: Nov. 2, 2004

(54) POROUS HIGH-ALUMINA FUSED CAST REFRACTORY AND METHOD OF ITS PRODUCTION

(75) Inventor: Toshihiro Ishino, Hyogo (JP)

(73) Assignee: Asahi Glass Company, Limited, Tokyo (JP)

( * ) Notice: Subject to any disclaimer, the term of this patent is extended or adjusted under 35 U.S.C. 154(b) by 212 days.

(21) Appl. No.: 10/059,201

(22) Filed: Jan. 31, 2002

(65) Prior Publication Data

US 2002/0103070 A1 Aug. 1, 2002

Related U.S. Application Data

(63) Continuation of application No. PCT/JP01/04522, filed on May 30, 2001.

(30) Foreign Application Priority Data

May 31, 2000 (JP) .......................................... 2000-162417

(51) Int. Cl.⁷ ......................... C04B 35/10; C04B 35/107
(52) U.S. Cl. .......................................... 501/127; 501/84
(58) Field of Search ............................. 501/127, 80, 84

(56) References Cited

U.S. PATENT DOCUMENTS 5,733,830 A     3/1998    Endo et al.
6,077,801 A * 6/2000    Zanoli et al. ................ 501/128

FOREIGN PATENT DOCUMENTS

JP        59-88360     5/1984
JP        2-116635    5/1990

* cited by examiner

*Primary Examiner*—Paul Marcantoni
(74) *Attorney, Agent, or Firm*—Oblon, Spivak, McClelland, Maier & Neustadt, P.C.

(57) ABSTRACT

The object of the present invention is to provide a refractory having sufficient corrosion resistance against alkali vapors and excellent thermal shock resistance which is light in weight and suitable for glass tank furnaces.

The present invention provides a high-alumina fused cast refractory comprising from 94 to 98% of $Al_2O_3$, from 1 to 6%, in total, of $Na_2O$ and/or $K_2O$, which is mainly composed of $\alpha$-$Al_2O_3$ crystals and $\beta$-$Al_2O_3$ crystals, has pores dispersed in it and has a porosity of from 5 to 30%.

20 Claims, No Drawings

POROUS HIGH-ALUMINA FUSED CAST REFRACTORY AND METHOD OF ITS PRODUCTION

This application is a Continuation of International Application No. PCT/JP01/04522 Filed on May 30, 2001

FIELD OF THE INVENTION

The present invention relates to a refractory used for glass tank furnaces, in particular, to a porous high-alumina fused cast refractory suitable for upper structures of glass tank furnaces, and a method of its production.

DESCRIPTION OF THE BACKGROUND

Fused cast refractories are provided by melting formulated refractory raw materials in an electric arc furnace completely, pouring the resulting melt into casting molds having predetermined configurations (casting), and solidifying the melt by cooling to ordinary temperature, in many cases, with heat insulation. It is widely known that fused cast refractories are denser and more corrosion-resistant than fired and unfired bonded refractories.

Among these fused cast refractories, high-$Al_2O_3$ fused cast refractories have suitably been used mainly as glass tank furnace refractories. For example, high alumina fused cast refractories mainly composed of $\alpha$-$Al_2O_3$ crystals and $\beta$-$Al_2O_3$ crystals are frequently used at portions of glass tank furnaces which contact with molten glass and have such dense structures that they have porosities of 4% and less, provided that pores called shrinkage cavities inevitably formed during the cooling step after casting are ignored.

Therefore, improvements of high-$Al_2O_3$ fused cast refractories have been focused on densification to minimum porosities with the aim of increasing corrosion resistance against glass.

In recent years, the application of the technique of oxygen burning to glass tank furnaces has generated a new demand on glass tank furnace refractories. Namely, though conventional glass tank furnaces usually use silica bricks having bulk specific gravities of about 2 for ceilings and other upper structures (such as crowns), there is a problem that high concentrations of alkali vapor in glass tank furnaces utilizing the technique of oxygen burning erodes silica bricks considerably. As a countermeasure, use of high-alumina fused cast refractories excellent in corrosion resistance against alkali vapor for these upper structures is considered. Conventional high-alumina fused cast refractories are grouped into two classes: those called void-free which are dense residues of refractories obtained by cutting off shrinkage cavities, and so-called regular casts, which partly contain shrinkage cavities.

It is unadvisable to use void-free high-alumina fused cast refractories for upper structures of glass tank furnaces because such low-porosity refractories having higher bulk specific gravities than silica bricks are heavy in weight and require upper structure supports having high mechanical strength. Another disadvantage of them is their poor thermal shock resistance due to their dense structures.

On the other hand, although regular cast high-alumina fused cast refractories containing shrinkage cavities have low bulk specific gravities, a problem that occurs is that cracks form along the border of the shrinkage cavities because of the great difference in physical properties across the border during the operation of the furnace.

Namely, conventional high-alumina fused cast refractories are advantageous in view of corrosion resistance against glass by virtue of their low porosity and denseness but their high bulk specific gravities is disadvantageous to their use for parts which do not require so much corrosion resistance such as upper structures in view of structural strength and cost.

Meanwhile, increases in the porosities of cast refractories have been attempted. For example, JP-A-59-88360 proposes a porous high-alumina fused case refractory having a porosity of at least 20%. Because the proposed refractory has an alkali metal oxide content as low as 0.25% or below, the porous high-alumina fused cast refractory is composed predominantely of $\alpha$-$Al_2O_3$ crystals. However, $\alpha$-$Al_2O_3$ crystals readily become $\beta$-$Al_2O_3$ crystals through reaction with alkali vapor while expanding in volume to form a brittle structure. Therefore, the proposed porous high-alumina fused cast refractory does not have enough corrosion resistance for use in the upper structure of glass tank furnaces.

JP-A-3-208869 proposes the use of a foaming agent such as a metal, carbon and a carbide to form pores. The use of a foaming agent has a problem in the production process because the vigorous foaming reaction between a foaming agent and a melt which involves generation of carbon dioxide or the like makes it difficult to control the melting.

SUMMARY OF THE INVENTION

The object of the present invention is to provide a porous high-alumina fused cast refractory which has sufficient corrosion resistance against an alkali vapor or the like, is light in weight and has excellent thermal shock resistance and a method of producing it.

DETAILED DESCRIPTION OF THE PREFERRED EMBODIMENTS

The present invention provides a porous high-alumina fused cast refractory comprising from 94 to 98 mass % of $Al_2O_3$, from 1 to 6 mass %, in total, of $Na_2O$ and/or $K_2O$ as chemical components, which is mainly composed of $\alpha$-$Al_2O_3$ crystals and $\beta$-$Al_2O_3$ crystals, has pores dispersed in it and has a porosity of from 5 to 30%.

The present invention also provides a method of producing a porous high-alumina fused cast refractory comprises from 94 to 98 mass % of $Al_2O_3$ from 1 to 6 mass %, in total, of $Na_2O$ and/or $K_2O$ as chemical components, which is mainly composed of $\alpha$-$Al_2O_3$ crystals and $\beta$-$Al_2O_3$ crystals, has pores dispersed in it and has a porosity of from 5 to 30%, which comprises blowing a gas, especially a gas containing oxygen, into a molten refractory material, casting and slowly cooling the refractory material to form pores in it dispersedly.

BEST MODE FOR CARRYING OUT THE INVENTION

The porous high-alumina fused cast refractory of the present invention (hereinafter referred to as the present cast refractory) comprises from 94 to 98 mass % (hereinafter abbreviated simply as %) of $Al_2O_3$, from 1 to 6%, in total, of $Na_2O$ and/or $K_2O$ (hereinafter referred to as alkali metal oxides) as chemical components.

If $Al_2O_3$ exceeded 98% or the alkali metal oxides were less than 1%, the refractory would be mainly composed of $\alpha$-$Al_2O_3$ crystals (corundum crystals, hereinafter referred to as $\alpha$-crystals) alone, which readily turn into $\beta$-$Al_2O_3$ crystals ($R_2O \cdot nAl_2O_3$, wherein R is Na or K, and n is a real number around 11, herein after referred to as $\beta$-crystals) upon contact with an alkali vapor while expanding in volume when used for upper structures of a glass tank furnace, and the corrosion resistance would become inadequate due to the resulting structural embrittlement.

On the other hand, if $Al_2O_3$ were 94% or less or the alkali metal oxides exceeded 6%, the present cast refractory would be mainly composed of β-crystals alone and have such a low compressive strength as 30 MPa or below, and use of the present cast refractory for upper structures of a glass furnace would make a problem in view of mechanical strength. It is preferred that $Al_2O_3$ is from 94.5 to 96.5%, and the alkali metal oxides are from 2.5 to 4.5%.

The present cast refractory preferably comprises $SiO_2$ as another component to form a matrix glass phase. The matrix glass phase helps formation of a crack-free refractory by relaxing strain stress which occurs during the annealing. The $SiO_2$ content is preferably from 0.3 to 1.5%, particularly from 0.5 to 1.0%.

The present cast refractory is mainly composed of β-crystals and β-crystals. In addition to α-crystals and β-crystals, the present cast refractory comprises a matrix glass phase comprising $SiO_2$, $R_2O$ and CaO as main components (hereinafter the present matrix glass phase) and pores and has such a structure that the matrix glass phase fills gaps between the crystals, and pores are dispersed between the α-crystals, β-crystals and the present matrix glass phase. It is preferred that pores are dispersed uniformly because the durability of the refractory increases with the uniformity of pore dispersion.

In the present invention, with respect to the mass ratio of α-crystals to β-crystals, the preferable ratio of α-crystals/(α-crystals+β-crystals) is from 30 to 70%. It is unfavorable that the mass ratio exceeds 70% because the α-crystals readily turns into β-crystals by reacting with an alkali vapor, and the accompanying volume expansion leads to embrittlement. It is also unfavorable that the mass ratio is less than 30%, because β-crystals turn into α-crystals in turn, and the accompanying volume shrinkage leads to structural embrittlement. The ratio of α-crystals to β-crystals can be controlled by adjusting the $R_2O$ content.

In the present cast refractory, pores are formed dispersedly, and the porosity is from 5 to 30%. In the present specification, the porosity is measured with the after removal of shrinkage cavities from the refractory. If the porosity is less than 5%, a porous high-alumina fused cast refractory which is light in weight and excellent in thermal shock resistance can not be obtained, and if the porosity exceeds 30%, the corrosion resistance against an alkali vapor and float components and the strength are insufficient. The porosity is preferably within the range of from 7 to 25%. The porosity (%) is calculated as porosity=$(1-(d_2/d_1))\times 100$ from the true specific gravity $d_1$ and the bulk specific gravity $d_2$.

In the present invention, it is preferred that at least 80%, preferably at least 90%, of the pores formed dispersedly in it have diameters of from 1 μm to 3 mm because pore are formed without remarkable deterioration in strength while sufficient corrosion resistance is secured. Though pores can have various shapes, because most pores are oval, the size of a pore means the average of the longer diameter and the shorter diameter in the present specification.

The present cast refractory is obtainable like ordinary fused cast refractories by formulating a refractory material of a predetermined composition, putting the refractory material in an electric furnace at a high temperature of at least 2000° C. until the refractory material melts completely, pouring the resulting melt into a casting mold having a predetermined shape by casting and slowly cooling the melt, but is characterized in that a large amount of a gas is blown into the melt before casting. Blowing of a gas into a melt allows favorable formation of pores in the refractory and production of a cast refractory having a much smaller amount of shrinkage cavities.

In the present invention, a gas is blown between fusion of the refractory material and casting, preferably while the refractory material is completely molten. A preferable way to blow a gas is to blow a large amount of a high temperature gas through a ceramic or metal tube inserted in the melt. Appropriate control of the kind of the gas, the blow time and the amount of the blow gas allows formation of a given amount of desired pores in the refractory.

In the present invention, though the mechanism of pore formation is unclear, but it is supposed that the high temperature blow gas dissolved in the melt in a supersaturated state is released as the solubility decreases upon cooling. Therefore, oxygen or an oxygen-containing gas containing at least 20 vol % of oxygen such as air is preferable as the blow gas because improvement of porosity is great in proportion of the amount of the blow gas by virtue of its low solubility at low temperature.

It is preferred that the oxygen-containing gas is blown in an amount of from 0.5 to 2.0 (L/1 kg melt) for a few minutes just before casting. A longer blow time is preferable in the case of a gas having a low oxygen content.

EXAMPLES

Now the present invention will be described with reference to Examples (Examples 1 to 8) and Comparative Examples (Examples 9 to 12).

Bayer's alumina (with a purity of 99% or above) as the $Al_2O_3$ source, silica sand (with a purity of 99% or above) as the $SiO_2$ source, and other material powders such as $Na_2CO_3$, $K_2CO_3$, and $Ca_2CO_3$ were mixed into material blends having predetermined compositions, and they were fused completely in a single phase AC 500 KVA arc electric furnace having graphite electrodes at temperatures of from 2000 to 2200° C.

Then, various gases (each having a purity of 99% or above) were blown in the amounts (L/1 kg melt) shown in Tables 1 and 2 for blow times (min) shown in Tables 1 and 2. The resulting melts were poured into graphite molds having internal dimensions of 130 mm×160 mm×350 mm, and the resulting casts were withdrawn from the graphite molds and allowed to cool to around room temperature in a slow cooling box while insulated with Bayer's alumina powder.

The Evaluation Results

The chemical compositions (%) and the ratio of α-crystals (%) (i.e. α-crystals/(α-crystals+β-crystals)) of the various fused cast refractories and the results of their evaluation are shown in Tables 1 and 2.

Bulk specific density: measured by Archimedes' method.

Compressive strength (MPa): measured in accordance with JIS R2206.

Thermal shock resistance (the number of cycles): A 50 mm×50 mm×50 mm specimen was cut out of each fused cast refractory and subjected to repeated cycles of 15 minutes of incubation in an electric furnace at an internal temperature of 1500° C. and 15 minutes of cooling down in the atmosphere, and evaluated from the number of cycles which had been repeated when a crack was first recognized on the surface with the naked eye.

Amount of corrosion (mm): For evaluation of corrosion resistance, a 50 mm×50 mm×50 mm specimen was cut out of each fused cast refractory and used as the rid of a crucible containing $Na_2CO_3$. The crucible was placed in an electric furnace at 1550° C. for 24 hours with the rid on it and taken out, and the amount of the corrosion of the specimen was measured. For reference, it is noted that silica bricks commonly used as a ceiling refractory for conventional glass tank furnaces corroded to a depth of 20 mm.

Appearance of the Corroded Surface:

After measurement of the amount of corrosion, the samples were inspected for swells and the like with the naked eye. Those having swells were rated as swollen, and those having no swells were rated as good.

Pore Information: The cast refractories were cut along the vertical axis of the casting mold and inspected for uniformity of pore distribution with the naked eye. In Examples 1 to 8, about 95% of the pores were from 1 μm to 3 mm in size, and the pore distribution was uniform.

TABLE 1

|  | Ex. 1 | Ex. 2 | Ex. 3 | Ex. 4 | Ex. 5 | Ex. 6 |
|---|---|---|---|---|---|---|
| Chemical composition |  |  |  |  |  |  |
| $Al_2O_3$ | 95 | 95 | 95 | 95 | 95 | 95 |
| $Na_2O$ | 3.5 | 3.5 | 3.5 | 3.5 | 3.0 | 3.5 |
| $K_2O$ | 0 | 0 | 0 | 0 | 0.5 | 0 |
| $SiO_2$ | 0.9 | 0.9 | 0.9 | 0.9 | 0.9 | 0.9 |
| CaO and others | 0.6 | 0.6 | 0.6 | 0.6 | 0.6 | 0.6 |
| Ratio of α-crystals | 40 | 40 | 40 | 40 | 50 | 40 |
| Blow amount |  |  |  |  |  |  |
| Oxygen gas | 0.7 | 1.3 | 1.7 | 0 | 1.7 | 7.0 |
| Nitrogen gas | 0 | 0 | 0 | 0 | 0 | 0 |
| Air | 0 | 0 | 0 | 1.7 | 0 | 0 |
| Blow time | 1 | 1 | 2 | 2 | 2 | 4 |
| Porosity | 5.2 | 11.5 | 18.1 | 5.5 | 15.0 | 28.4 |
| Bulk specific gravity | 3.31 | 3.09 | 2.86 | 3.30 | 2.90 | 2.50 |
| Compressive strength | 167 | 142 | 122 | 170 | 130 | 75 |
| Amount of corrosion | 0 | 0 | 0 | 0 | 0 | 2 |
| Appearance of corroded surface | Good | Good | Good | Good | Good | Swollen |
| Thermal shock resistance | 8 | 10 | 10 | 6 | 10 | 10 |

TABLE 2

|  | Ex. 7 | Ex. 8 | Ex. 9 | Ex. 10 | Ex. 11 | Ex. 12 |
|---|---|---|---|---|---|---|
| Chemical composition |  |  |  |  |  |  |
| $Al_2O_3$ | 97 | 94.2 | 95 | 93 | 98.5 | 95 |
| $Na_2O$ | 2.0 | 4.5 | 3.5 | 6.5 | 0.3 | 3.5 |
| $K_2O$ | 0 | 0 | 0 | 0 | 0 | 0 |
| $SiO_2$ | 0.5 | 0.8 | 0.8 | 0.2 | 0.25 | 0.8 |
| CaO and others | 0.5 | 0.5 | 0.7 | 0.3 | 0.25 | 0.7 |
| Ratio of α-crystals | 70 | 30 | 40 | 0 | 100 | 40 |
| Blow amount |  |  |  |  |  |  |
| Oxygen gas | 1.7 | 1.7 | 0 | 0 | 0 | 10 |
| Nitrogen gas | 0 | 0 | 0 | 0 | 0 | 0 |
| Air | 0 | 0 | 0 | 0 | 0 | 0 |
| Blow time | 2 | 2 | 0 | 0 | 0 | 2 |
| Porosity | 25.0 | 17.0 | 3.4 | 8.0 | 5.2 | 34.1 |
| Bulk specific gravity | 2.80 | 2.75 | 3.37 | 3.00 | 3.70 | 2.30 |
| Compressive strength | 90 | 70 | 180 | 30 | 250 | 60 |

TABLE 2-continued

|  | Ex. 7 | Ex. 8 | Ex. 9 | Ex. 10 | Ex. 11 | Ex. 12 |
|---|---|---|---|---|---|---|
| Amount of corrosion | 3 | 0 | 0 | 0 | 5 | 5 |
| Appearance of corroded surface | Swollen | Good | Good | Good | Swollen | Swollen |
| Thermal shock resistance | 6 | 10 | 2 | 20 | 1 | 10 |

INDUSTRIAL APPLICABILITY

The present cast refractory has sufficient corrosion resistance against alkali vapors and the like and excellent thermal shock resistance and therefore is suitable as a glass tank furnace refractory. Besides, because of its porous structure in which fine pores are uniformly dispersed, it has a small bulk specific gravity and is light in weight and obtainable at low cost.

Accordingly, it is a perfect refractory for structural parts of glass tank furnaces such as upper structures, especially for the upper structure of oxygen-burning glass tank furnaces.

Because no foaming agent is used in its production, dissolution control is easy. Therefore, the present invention makes it possible to produce porous high-alumina fused cast refractories having pores dispersed uniformly in it readily at low cost.

The entire disclosure of Japanese Patent Application No. 2000-162417 filed on May 31, 2000 including specification, claims and summary are incorporated herein by reference in its entirety.

What is claimed is:

1. A porous high-alumina fused cast refractory, comprising:
   from 94 to 98 weight % of $Al_2O_3$, from 1 to 6 weight %, in total, of $Na_2O$ or $K_2O$ or both as chemical components, which cast refractory mainly comprises α-$Al_2O_3$ crystals and β-$Al_2O_3$ crystals in a ratio of α-$Al_2O_3$ crystals to the sum of α-$Al_2O_3$ crystals and β-$Al_2O_3$ crystals ranging from 30 to 70 weight %, and which has pores dispersed therein said cast refractory having a porosity ranging from 5 to 30%.

2. The porous high-alumina fused cast refractory according to claim 1, which comprises from 94.5 to 96.5 weight % of $Al_2O_3$, from 2.5 to 4.5 weight %, in total, of $Na_2O$ and/or $K_2O$ and from 0.3 to 1.5 weight % of $SiO_2$.

3. The porous high-alumina fused cast refractory according to claim 2, which comprises α-$Al_2O_3$ crystals, β-$Al_2O_3$ crystals, a matrix glass phase comprising $SiO_2$, $R_2O$ and CaO as main components, and pores, and has such a structure that the matrix glass phase fills gaps between the crystals, and the pores are dispersed between the α-$Al_2O_3$ crystals, the β-$Al_2O_3$ crystals and the matrix glass phase.

4. The porous high-alumina fused cast refractory according to claim 3, wherein at least 80% of the pores dispersed therein have diameters ranging from 1 μm to 3 mm.

5. The porous high-alumina fused cast refractory according to claim 2, wherein the content of $SiO_2$ ranges from 0.5 to 1.0%.

6. The porous high-alumina fused cast refractory according to claim 1, wherein the porosity ranges from 7 to 25%.

7. The porous high-alumina fused cast refractory according to claim 4, wherein at least 90% of the pores have diameters ranging from 1 μm to 3 mm.

8. The porous high-alumina fused cast refractory according to claim 7, wherein 95% of the pores have diameters ranging from 1 μm to 3 mm.

9. The porous high-alumina fused cast refractory according to claim 1, comprising 95 weight % of $Al_2O_3$, 3.5 weight % of $Na_2O$ or $Na_2O$ and $K_2O$, 0.9 weight % of $SiO_2$ and 0.6 weight % of remaining components, comprising CaO.

10. The porous high-alumina fused cast refractory according to claim 1, having a porosity ranging from 3.4 to 34.1%.

11. The porous high-alumina fused cast refractory according to claim 1, having a bulk specific gravity ranging from 2.30 to 3.70.

12. The porous high-alumina fused cast refractory according to claim 1, having a compressive strength ranging from 30 to 250.

13. The porous high-alumina fused cast refractory according to claim 1, having a thermal shock resistance ranging from 1 to 20.

14. A method of producing a porous high-alumina fused cast refractory, comprising:

blowing a gas into a molten refractory material which results in the production of said high-alumina fused cast refractory having a composition of from 94 to 98 weight % $Al_2O_3$, from 1 to 6 weight %, in total, of $Na_2O$ or $K_2O$ or both as chemical components, which is mainly composed of $\alpha$-$Al_2O_3$ crystals and $\beta$-$Al_2O_3$ crystals in a ratio of $\alpha$-$Al_2O_3$ crystals to the sum of $\alpha$-$Al_2O_3$ crystals and $\beta$-$Al_2O_3$ crystals ranging from 30 to 70 weight %, and which has pores dispersed therein such that the cast refractory has a porosity ranging from 5 to 30%;

casting said molten refractory material; and cooling the refractory material to form pores dispersed within the refractory.

15. The method of producing a porous high-alumina fused cast refractory according to claim 14, wherein the gas is an oxygen-containing gas.

16. The method of producing a porous high-alumina fused cast refractory according to claim 14, wherein the gas is blown into the refractory material during the interval of time between fusion of the refractory material and casting of the refractory material while the refractory material is completely molten.

17. The method of producing a porous high-alumina fused cast refractory according to claim 14, wherein the gas is blown through a ceramic or metal tube into the refractory material.

18. The method of producing a porous high-alumina fused cast refractory according to claim 15, wherein the oxygen-containing gas comprises at least 20 vol % of oxygen.

19. The method of producing a porous high-alumina fused cast refractory according to claim 15, wherein the oxygen-containing gas is air.

20. The method of producing a porous high-alumina fused cast refractory according to claim 14, wherein said gas that is blown into said refractory material is blown in an amount ranging from 0.5 to 2.0 L/1 kg melt.

* * * * *